United States Patent
Hsu et al.

(10) Patent No.: US 10,756,627 B2
(45) Date of Patent: Aug. 25, 2020

(54) ENHANCED SWITCHING REGULATOR TOPOLOGY WITH ADAPTIVE DUTY CONTROL AND SEAMLESS TRANSITION OF OPERATING MODES

(71) Applicant: Microchip Technology Incorporated, Chandler, AZ (US)

(72) Inventors: Alex Hsu, Kowloon (HK); Sam Tsui, Tsing Yi (HK); Paolo Nora, Belgioioso (IT); Tsz Yin Man, Shatin (HK)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 16/127,633

(22) Filed: Sep. 11, 2018

(65) Prior Publication Data
US 2019/0081546 A1 Mar. 14, 2019

Related U.S. Application Data

(60) Provisional application No. 62/558,855, filed on Sep. 14, 2017.

(51) Int. Cl.
*H02M 3/158* (2006.01)
*H02M 1/00* (2006.01)

(52) U.S. Cl.
CPC .... *H02M 3/158* (2013.01); *H02M 2001/0032* (2013.01)

(58) Field of Classification Search
CPC ............................................. H02M 2001/0032
See application file for complete search history.

(56) References Cited

U.S. PATENT DOCUMENTS 8,624,571 B2 1/2014 Da Silva et al. ............. 323/283
9,154,037 B2 10/2015 Chen
(Continued)

OTHER PUBLICATIONS

International Search Report and Written Opinion, Application No. PCT/US2018/050983, 11 pages, dated Dec. 12, 2018.

*Primary Examiner* — Thienvu V Tran
*Assistant Examiner* — Peter M Novak
(74) *Attorney, Agent, or Firm* — Slayden Grubert Beard PLLC

(57) ABSTRACT

A switch mode power supply (voltage converter) is adapted as a current-mode control buck regulator for different loading conditions. The voltage converter operates in a continuous conduction mode (CCM) during heavy load conditions using pulse width modulation (PWM). When a zero-current detector determines no inductor current during light load conditions (discontinuous conduction mode (DCM) region), the controller initiates adaptive duty control using pulse frequency modulation (PFM). Adaptive duty estimation circuitry provides controllable energy to charge the power inductor to maintain voltage accuracy and maximize efficiency when in the PFM mode. Using clock synchronization and a single control-loop, smooth transition between PFM, PWM, and bypass modes is automatically performed. Clock synchronization from a master oscillator provides a base for frequency division in different operation modes which gives controllable evenly distributed switching harmonics. An inductor zero-current detector triggers an adaptive estimated duty cycle that is synchronized with the master oscillator.

22 Claims, 9 Drawing Sheets

(56) References Cited

U.S. PATENT DOCUMENTS

| | | | |
|---|---|---|---|
| 9,312,765 B2 | 4/2016 | Walsh et al. | |
| 9,602,000 B2 | 3/2017 | Teh | |
| 2008/0057900 A1* | 3/2008 | Fang | H04L 25/063 455/296 |
| 2010/0102878 A1* | 4/2010 | Nagata | G01C 19/56 330/86 |
| 2010/0164579 A1* | 7/2010 | Acatrinei | H02M 1/4208 327/172 |
| 2010/0289330 A1* | 11/2010 | Uchida | H02M 3/158 307/9.1 |
| 2014/0340062 A1* | 11/2014 | Jain | H02M 3/156 323/282 |
| 2016/0087579 A1* | 3/2016 | Moslehi | H01L 31/0516 136/251 |

* cited by examiner

ENHANCED SWITCHING REGULATOR TOPOLOGY WITH ADAPTIVE DUTY CONTROL AND SEAMLESS TRANSITION OF OPERATING MODES

RELATED PATENT APPLICATION

This application claims priority to commonly owned U.S. Provisional Patent Application Ser. No. 62/558,855; filed Sep. 14, 2017; entitled "High Efficiency, Small Voltage Ripple Buck Converter with Adaptive Calculation," by Alex Hsu, Sam Tsui, Paolo Nora and Tsz Yin Man; and is hereby incorporated by reference herein for all purposes.

TECHNICAL FIELD

The present disclosure relates to voltage converters and, more particularly, to a high efficiency, small voltage ripple buck converter having adaptive duty control.

BACKGROUND

Efficiency at light load conditions in voltage converters, e.g., switch mode power supplies (SMPS), is generally improved by the SMPS controller using a pulse frequency modulation (PFM) mode instead of the more standard pulse width modulation (PWM) mode. PWM provides better output voltage regulation but PFM provides greater SMPS efficiency at light current loads. Unfortunately, a side effect of PFM is a larger output ripple voltage that reduces voltage output accuracy. Using a PFM mode for light current loads and a PWM mode for heavier currents would be desirable. However, implementing both PFM and PWM modes in SMPS controllers may require mode transitions with pre-defined and accurate thresholds that may be very difficult to implement in production SMPSs. In addition, a bypass mode may occur when the PWM is on all the time due to high current load.

Mode transition selection may require threshold tuning, and lack adaptive duty control for output voltage accuracy. Present technology solutions to achieve mode transitions may require one or more pre-defined transition thresholds, additional comparators for the PFM mode, additional circuits for bypass mode, and the mode selections may bounce back-and-forth. Also, the PFM mode may become unsynchronized at light loads.

SUMMARY

Therefore, what is needed is a switching regulator topology that seamlessly transitions between PFM, PWM and bypass modes of operation; and maintains good voltage regulation and frequency synchronization.

According to an embodiment, a method for seamless mode transition in a switching regulator may use a pulse width modulation (PWM) mode to provide current pulses to a power inductor when in a continuous conduction mode (CCM) during a first load condition. The method may further use a pulse frequency modulation (PFM) mode to provide current pulses to the power inductor when in a discontinuous conduction mode (DCM) during a second load condition. The first load condition may be greater than the second load condition. The method may further synchronize switching between PWM and PFM modes to a master clock having a frequency.

According to a further embodiment of the method, the step of synchronizing switching between PWM and PFM modes may be done with a single control loop. According to a further embodiment of the method, the step of using the PFM mode may further comprise the steps of reducing switching frequency with adaptive clock frequency division and duty cycle estimation. According to a further embodiment of the method, the step of adaptive clock frequency division may comprise the step of dividing the master clock frequency by N. According to a further embodiment of the method, the step of duty cycle estimation may comprise the step of calculating the duty cycle duration based on input voltage and output voltage.

According to a further embodiment of the method, the step of duty cycle estimation may comprise the step of scaling the duty cycle duration in proportion to the master clock frequency division. According to a further embodiment of the method, N may be equal to two (2). According to a further embodiment of the method, N may be a positive integer number. According to a further embodiment of the method, N may be equal to $2^P$, where P may be a positive number equal to or greater than one (1). According to a further embodiment of the method, the step of dividing the master clock frequency by N may further comprise the step of dividing the master clock frequency by N when substantially zero (0) current in the power inductor may be detected.

According to a further embodiment of the method, may comprise the step of detecting substantially zero (0) current in the power inductor before a next clock cycle. According to a further embodiment of the method, the switching frequency may be reduced when load current may be reduced. According to a further embodiment of the method, may comprise the step of using a by-pass mode to provide current to the power inductor during a third load condition, wherein the third load condition may be greater than the first load condition.

According to another embodiment, a controller for a switching regulator with adaptive duty control and seamless transition of operating modes may comprise a high-side current sensor for providing a high-side current signal representing current going into a power inductor. The controller may further comprise a low-side current sensor for providing a low-side current signal representing current in the power inductor. The controller may further comprise a zero-current detector coupled to the low-side current sensor, wherein the current detector provides detection of substantially zero current in the power inductor. The controller may further comprise a pulse generator for generating pulse width modulation and pulse frequency modulation. The controller may further comprise an adaptive on-duty generator coupled to the pulse generator wherein the adaptive on-duty generator controls a high side ON time thereof. The controller may further comprise a differential amplifier having a first input coupled to a voltage output of the switching regulator and a second input coupled to a voltage reference. The controller may further comprise a voltage comparator having a first input coupled to an output of the differential amplifier and a second input coupled to a voltage having a sawtooth waveform from a current sense and slope compensation circuit. The current sense and slope compensation circuit may be coupled to the high-side current sensor. The voltage comparator causes the pulse generator to turn off a high side power transistor coupled between a voltage source and the power inductor when the sawtooth voltage from the current sense and slope compensation circuit may be greater than the output voltage of the differential amplifier during a pulse width modulation (PWM) mode. The adaptive on-duty generator may be coupled to the zero-current detector, wherein when substantially zero current is detected in the power inductor the adaptive on-duty generator switches to a pulse frequency modulation (PFM) mode for controlling the pulse duty generator so as to have similar amounts of energy per switching cycle as during the PWM mode of operations. The controller may further comprise a master clock oscillator coupled to the adaptive on-duty generator.

According to a further embodiment, the adaptive on-duty generator may comprise an ON timer and logic circuits for estimating on-time required during operation of the PFM mode. According to a further embodiment, the differential amplifier may comprise an operational transconductance amplifier (OTA). According to a further embodiment, the differential amplifier may comprise a voltage operational amplifier. According to a further embodiment, the voltage reference may comprise a digital-to-analog converter (DAC). According to a further embodiment, the controller for the switching regulator may comprise a mixed signal microcontroller. According to a further embodiment, the microcontroller may comprise a power management integrated circuit (PMIC).

According to yet another embodiment, a switching regulator voltage converter with adaptive duty control and seamless transition of operating modes may comprise a power inductor having first and second nodes. The switching regulator voltage converter may further comprise a capacitor couple between the second node of the power inductor and a voltage common, wherein the second node of the power inductor and voltage common may be adapted for coupling to and providing regulated voltage and current to an electronic device. The switching regulator voltage converter may further comprise a high-side current sensor for providing a high-side current signal representing current going into the power inductor. The switching regulator voltage converter may further comprise a high side power transistor coupled between a voltage source and the first node of the power inductor. The switching regulator voltage converter may further comprise a low-side power transistor coupled between the first node of the power inductor and the voltage common. The switching regulator voltage converter may further comprise a low-side current sensor for providing a low-side current signal representing current in the power inductor. The switching regulator voltage converter may further comprise a zero-current detector coupled to the low-side inductor current sensor and providing detection of substantially zero current in the power inductor. The switching regulator voltage converter may further comprise a pulse generator for generating pulse width modulation and pulse frequency modulation. The switching regulator voltage converter may further comprise an adaptive on-duty generator coupled to the pulse generator and controlling a high side ON time thereof. The switching regulator voltage converter may further comprise a differential amplifier having a first input coupled to the second node of the power inductor and a second input coupled to a voltage reference. The switching regulator voltage converter may further comprise a voltage comparator having a first input coupled to an output of the differential amplifier and a second input coupled to a voltage having a sawtooth waveform from a current sense and slope compensation circuit. The current sense and slope compensation circuit may be coupled to the high-side current sensor. The voltage comparator causes the pulse generator to turn off a high side power transistor coupled between a voltage source and the power inductor when the sawtooth voltage from the current sense and slope compensation circuit may be greater than the output voltage of the differential amplifier during a pulse width modulation (PWM) mode. The switching regulator voltage converter may further comprise an adaptive on-duty generator coupled to the zero-current detector, wherein when substantially zero current is detected in the power inductor the adaptive on-duty generator switches to a pulse frequency modulation (PFM) mode for controlling the pulse duty generator so as to have similar amounts of energy per switching cycle as during the PWM mode of operation. The switching regulator voltage converter may further comprise a master clock oscillator coupled to the adaptive on-duty generator.

According to a further embodiment, a voltage divider may be coupled between the second node of the power inductor and the first input of the differential amplifier.

BRIEF DESCRIPTION OF THE DRAWINGS

A more complete understanding of the present disclosure may be acquired by referring to the following description taken in conjunction with the accompanying drawings wherein.

Figure 1:
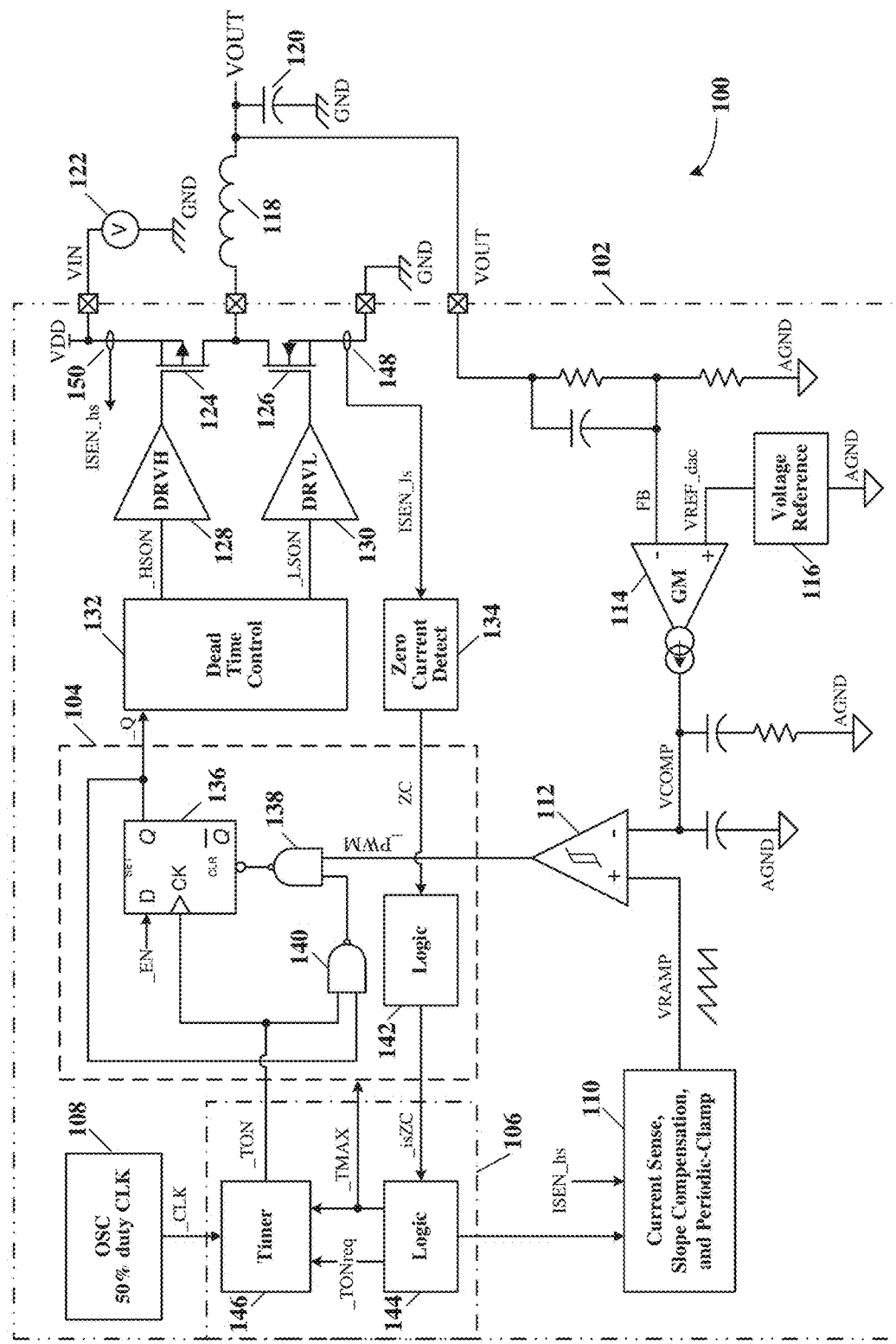
FIG. 1 illustrates a schematic block diagram of an enhanced adaptive duty current mode buck voltage converter with single control loop and seamless-mode-transition, according to specific example embodiments of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the forms disclosed herein.

DETAILED DESCRIPTION

Embodiments of the present disclosure may implement a voltage converter, or controller for a voltage converter for different loading conditions. The voltage converter may be, for example but is not limited to, a current-mode control buck regulator. The voltage converter may be a current-mode control regulator for different loading conditions. Embodiments of the present disclosure may integrate enhanced adaptive duty estimation into such a converter. Embodiments of the present disclosure may also integrate with voltage-mode control switching regulators. In one embodiment, an inductor zero-current detector may be included to trigger an adaptive estimated duty cycle. This may be synchronized with a base clock.

In some cases, the voltage converter, e.g., buck regulator, may operate in a continuous conduction mode (CCM) during heavy load conditions using pulse width modulation (PWM). When the zero-current detector determines no inductor current during light load conditions (discontinuous conduction mode (DCM) region), the controller may initiate or be requested to initiate adaptive duty control using pulse frequency modulation (PFM).

Adaptive duty estimation circuitry may provide controllable energy to charge the power inductor to maintain voltage accuracy and maximize efficiency when in the PFM mode. With clock synchronization and a single control-loop, the controller may automatically transition between PFM, PWM, and bypass modes smoothly. Clock synchronization provides a base for frequency division in different operation modes which gives controllable evenly distributed switching harmonics.

The converter may maintain output voltage accuracy under different load conditions in all relevant operating modes. The converter may improve conversion efficiency by using an adaptive duty cycle to reduce switching frequency during PFM mode operation. The converter may synchronize to a master clock in all relevant modes. The converter may be useful for generating multi-phase or multi-channel applications. The converter may provide controllable EMC frequency harmonics.

The converter may be particularly useful, though not limited, to portable applications. These applications in mobile devices or the Internet of Things (IoT) may need robust, highly efficient and cost-effective regulators. The converter may be a high-performance voltage regulator as required by various microcontroller or microprocessor cores. The converter may utilize a high conversion efficiency for such portable devices and a high output voltage accuracy for such microcontroller or microprocessor cores, according to the teachings of this disclosure.

As discussed above, the converter may include a single control loop that provides seamless transition between the converter conduction modes. There is no predefined threshold required. A circuit block may be added to a current mode topology converter with modified control logic. The control loop may provide seamless transition between modes (PFM, PWM, bypass) and be stable without the operating modes switching back-and-forth.

The enhanced adaptive duty cycle may optimize performance in PFM mode. The duty cycle may maintain output voltage accuracy and improve the conversion efficiency.

The switching activities may be synchronized to a fixed frequency clock. This may allow multi-phase and multi-channel designs. Furthermore, it may facilitate synchronized and evenly distributed switching activities and benefits to electromagnetic interference (EMI) sensitive applications.

Referring now to the drawings, the details of example embodiments are schematically illustrated. Like elements in the drawings will be represented by like numbers, and similar elements will be represented by like numbers with a different lower-case letter suffix.

Referring now to FIG. 1, depicted is a schematic block diagram of an enhanced adaptive duty current-mode buck voltage converter with single control loop and seamless-mode-transition, according to a specific example embodiment of this disclosure. This converter may include a single control loop that is capable of automatic transition between all the relevant operating modes, e.g., PFM, PWM and bypass modes. The current-mode buck voltage converter, generally represented by the numeral 100, may comprise an enhanced adaptive duty controller-power driver 102, a power inductor 118, a load filter capacitor 120, and be adapted for connection to a power source 122.

The enhanced adaptive duty controller-power driver 102 may comprise a pulse generator 104, an adaptive on-duty generator 106, a fixed frequency clock oscillator 108 that may have a 50 percent duty cycle output (CLK); current sense, slope compensation and periodic-clamp circuits 110; a voltage comparator 112 with hysteresis, an operational transconductance amplifier (OTA) 114, a voltage reference 116, e.g., a digital-to-analog converter (DAC), a dead time control circuit 132, a zero current detector 134, high side transistor driver 128, low side transistor driver 130, high-side power transistor 124, low-side power transistor 126, high-side current sensor 150 (signal ISEN_hs), and low-side current sensor 148 (signal ISEN_ls). The power transistors 124 and 126 may be metal oxide semiconductor field effect transistors (MOSFETs) N-channel and P-channel, respectively. The dead time control circuit 132 prevents current shoot-through in the transistors 124 and 126. The zero-current detector 134 may determine when there is substantially no current flow in the power inductor 118 by monitoring a signal (ISEN_ls) from the low side current sensor 148.

The pulse generator 104 may comprise a D-flipflop (latch), NAND gates 138 and 140, and a zero-current detection logic circuit 142 having an input coupled to the zero current (ZC) signal from the zero current detector 134. The adaptive on-duty generator 106 comprises a timer 146 and logic 144. The timer 146 is coupled to and synchronized with the clock oscillator 108. Wherein the timer 146 produces a control signal _TON which is also synchronized to the clock oscillator 108.

The logic signal _EN may be generated by a system or an external enable signal. When the logic signal _EN is at a logic high and then the signal _TON (CK) switches to a logic high, the output of flipflop 136 will be at a logic high. Wherein signal _Q is coupled through the dead time control 132 and the high side driver 128 to the gate of the high-side power transistor 124, thereby turning on transistor 124 which then couples VIN from the voltage source 122 to charge the power inductor 118.

As the current in the inductor 118 increases so does a voltage (VOUT) on the capacitor 120. The VOUT voltage is coupled through a voltage divider to a negative input of the OTA 114. Wherein the OTA 114 provides an output signal VCOMP that represents VOUT divided by the voltage divider minus the voltage reference 116. As the current in the inductor 118 increases so does VOUT. However, when VRAMP (sawtooth waveform) becomes greater than VCOMP the output of the comparator 112 changes from a logic low to a logic high, which resets signal _Q (output of the flipflop 136) and turns off the high-side power transistor 124, and thereafter turns on the low-side power transistor 126. This operating cycle repeats.

Figure 2:
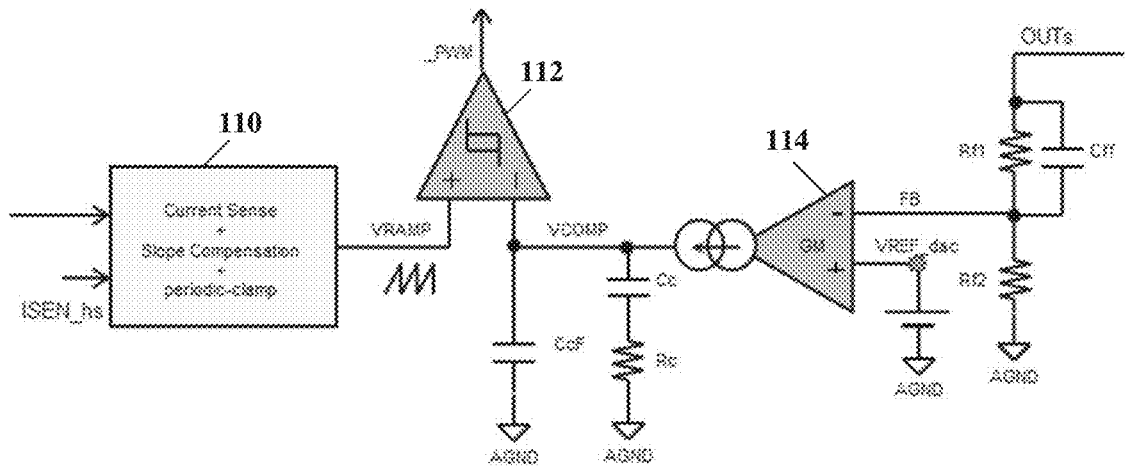
FIG. 2 illustrates a schematic block diagram of voltage converter control when in the PFM mode, according to specific example embodiments of this disclosure.
Figure 2:
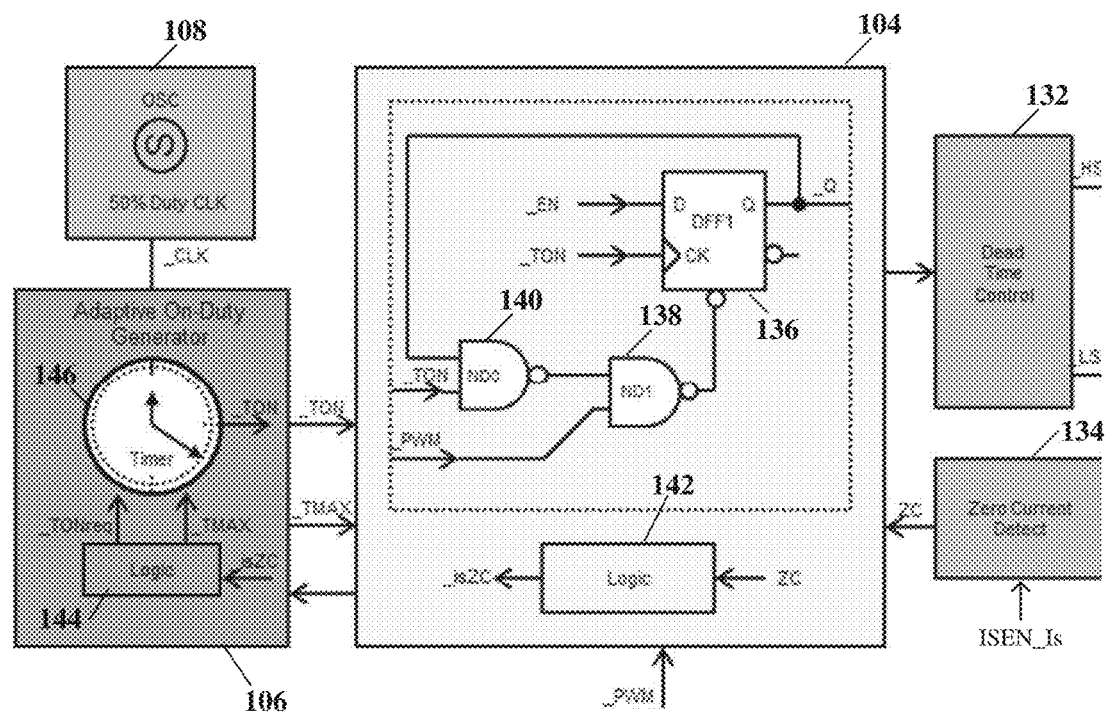

Referring to FIG. 2, depicted is a schematic block diagram of voltage converter control when in the PFM mode, according to specific example embodiments of this disclosure. In the PFM mode, detection of zero current (ISEN_ls) triggers an ON-duty request (through the zero-current detector 134 and the logic 142. The logic 142 checks the condition of the output from the zero current detection circuit 134 and generates a signal _isZC to an input of the adaptive on-duty generator 106, specifically to circuit logic 144. Logic 142 performs a condition check to see if an adaptive ON-duty is required for next cycle operation controlled by the adaptive on-duty generator 106.

The adaptive on-duty generator 106 estimates the required pulse width of _TON depending on the ratio of VOUT to VIN. _Q might not be resettable until the expiration of the _TON. This means that the energy pumping to the power inductor 118 per cycle is at least as much as that when in the PWM mode. If more energy is put into the power inductor 118, VOUT will increase, but VCOMP will decrease. In general, a VCOMP decrease means the system is going to correct the extra energy in the power inductor 118 in a close-loop system. Typically, VCOMP decrease will reduce the coming duty cycle and reduce energy being put into the power inductor 118.

When VCOMP is less than VRAMP, _PWM remains high to reset _Q from the D-flipflop 136. A reset-dominated the D flip-flop or latch 136 may guarantee subsequent _TON being skipped until _PWM goes low again. This happens when VCOMP is higher than VRAMP again. The low side current sensor 148 monitors the current in the power inductor 118 and its output signal (ISEN_ls), proportional to this current, is coupled to an input of the zero-current detector 134.

Figure 3A:
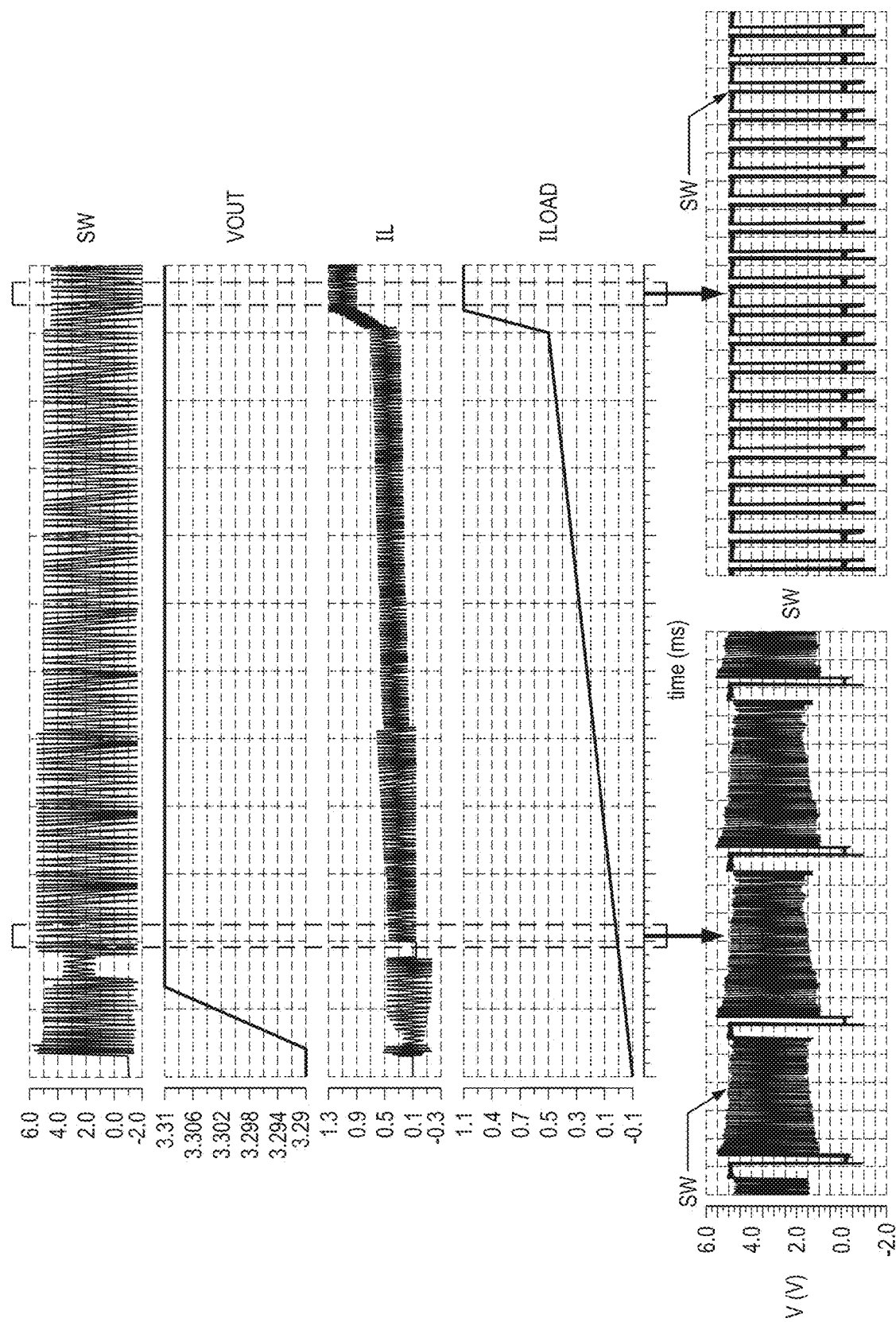
FIG. 3 illustrates a graphical representation of the voltage converter waveforms when going from PFM to PWM mode operation, according to specific example embodiments of this disclosure.
Figure 3B:
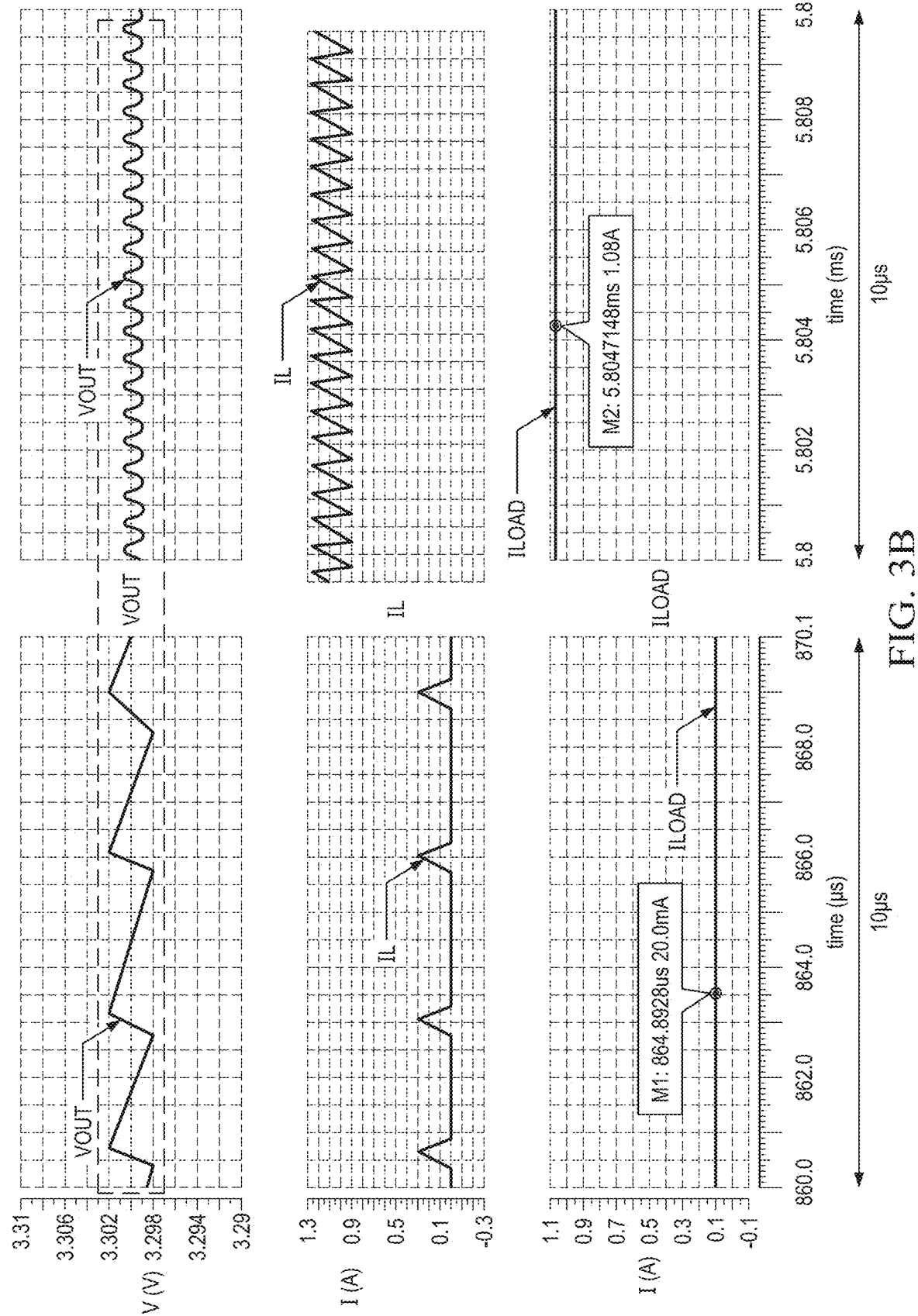

Referring now to FIG. 3, depicted is a graphical representation of the voltage converter waveforms when going from PFM to PWM mode operation, according to specific example embodiments of this disclosure. In the PFM mode, for example but not a limitation, VIN may be about 5 volts, VOUT may be about 3.3 volts, the inductance of the power inductor 118 may be about 1.5 µH, capacitor 120 (COUT) may be about 22 µF, and the ILOAD current may be about 20 mA. The output ripple voltage may be approximately 3 mV. In PWM mode, VIN may be about 5 volts, VOUT may be about 3.3 volts, L may be 1.5 µH, COUT may be about 22 µF, and the ILOAD may be about 1 A. The output ripple voltage may be approximately 2 mV. Thus, a seamless transition may be performed by using the zero-current detection (zero current detector 134).

Referring back to FIG. 1, when in the PWM mode, the high-side power transistor 124 turns off when VRAMP is greater than VCOMP. VRAMP is clamped by a pulse synchronized to the fixed frequency oscillator (e.g., clock 108). When the supply voltage VIN drops, VCOMP increases and the slope of VRAMP decreases, which in turn, increases the turn on duty of the high-side power transistor 124. Further decreasing the supply voltage causes VCOMP higher than VRAMP all the time. Thus _PWM remains low and _Q remains high all the time. Therefore, the high-side power transistor 124 is always on when in the bypass mode.

Figure 4:
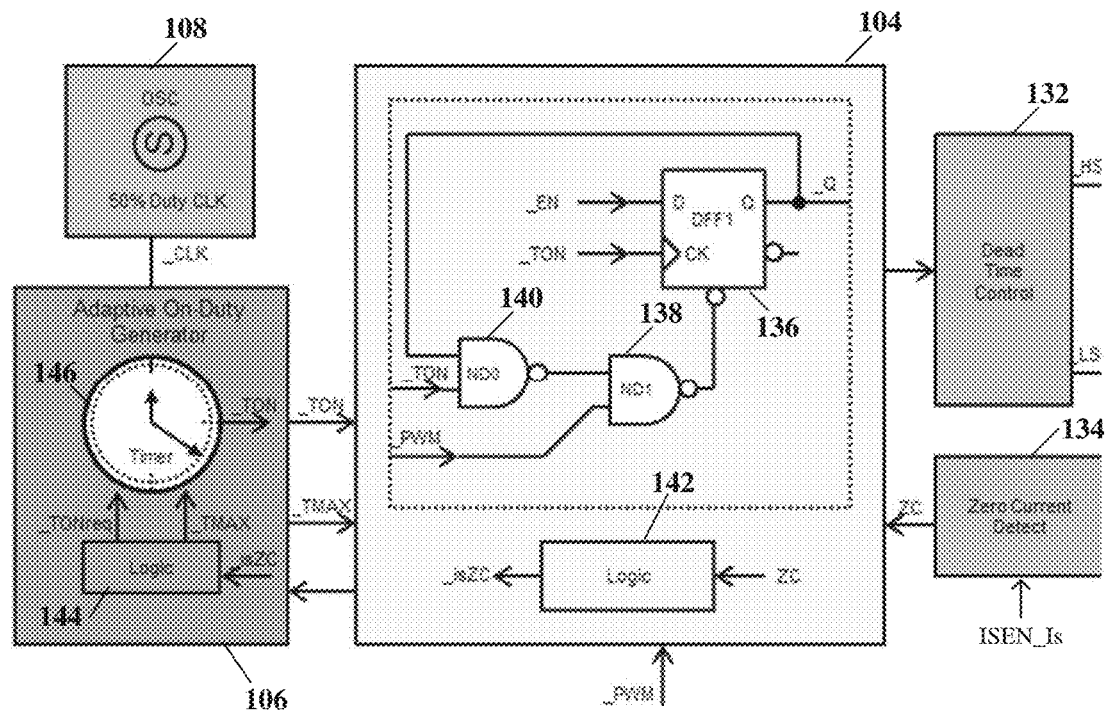
FIG. 4 illustrates schematic diagrams of enhanced adaptive duty cycle circuit logic and timing graphs thereof, according to specific example embodiments of this disclosure.
Figure 4:
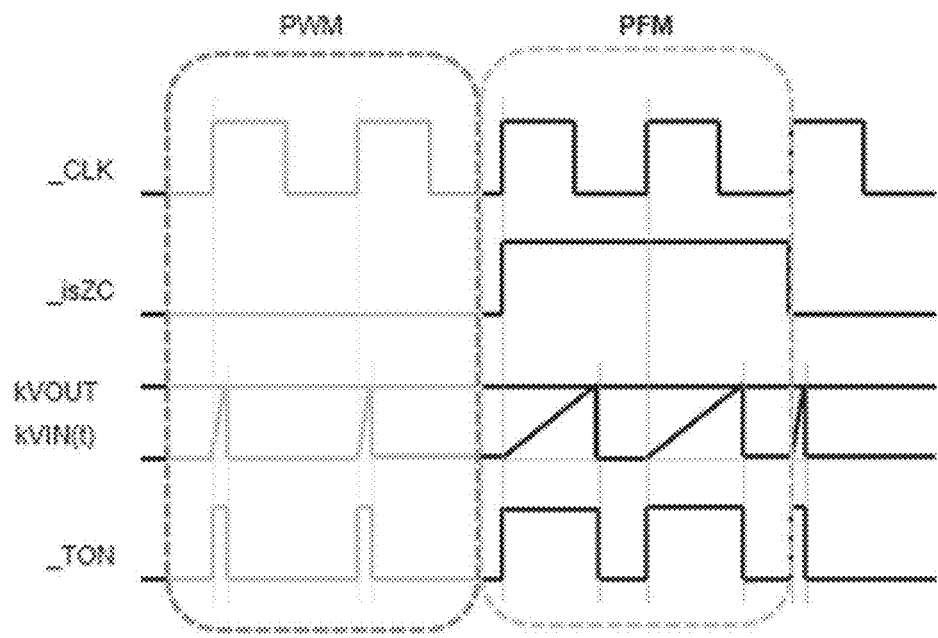

Referring now to FIG. 4, depicted are schematic diagrams of enhanced adaptive duty cycle circuit logic and timing graphs thereof, according to specific example embodiments of this disclosure. With the enhanced adaptive duty cycle, a controllable amount of energy is provided for charging the power inductor 118 when in the PFM mode. A similar amount of energy may be provided (pumped) to the output (load) per switching cycle in both PWM and PFM modes of operation. Thus, the output voltage accuracy may be maintained. The switching frequency may be reduced according to the load current, as disclosed more fully hereinafter. kVOUT is a scaled output voltage. The scaling factor is applied to a circuit with VIN detection to generate a cycle by cycle kVIN(t) waveform. When kVIN(t=TON), it hits kVOUT. This gives a target duty cycle at its operating condition.

Figure 5:
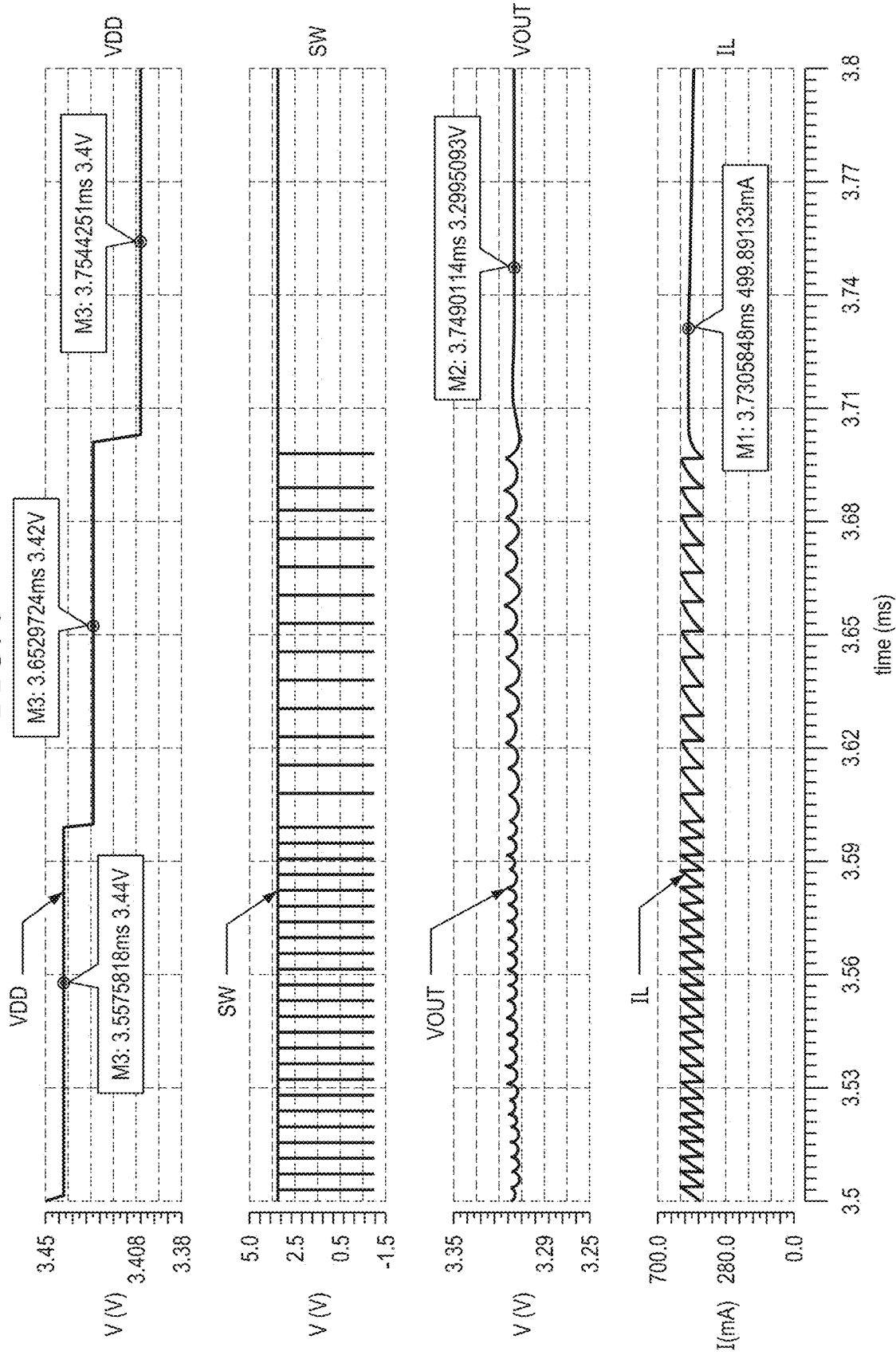
FIG. 5 illustrates a timing diagram of voltage waveforms during switching synchronization to a master clock in all modes, according to specific example embodiments of this disclosure.

Referring now to FIG. 5, depicted is a timing diagram of voltage waveforms during switching synchronization to a master clock in all modes, according to specific example embodiments of this disclosure. When going from the PWM mode to the bypass mode, as shown in the second from top graph, VIN (VDD) may be decreasing at a rate of –20 mV/step, VOUT may be 3.3 volts, L may be 1.5 µH, COUT (120) may be 22 µF, and ILOAD may be 500 mA. The performance may be enhanced by switching to a divided clock frequency for smoothing out mode transition. This control scheme gives a clock-based operation in different modes. This means peak-to-peak inductor current and output voltage ripple may be estimable by varying an integer scale factor on the clock frequency. Mode transition will be smooth because to there is no sudden changes on peak-to-peak inductor current and output ripple voltage.

Adaptive duty estimation circuitry may maximize conversion efficiency. Switching harmonics may be controllable and evenly distributed. Adaptive duty estimation circuitry (adaptive on-duty generator 106) gives a proper ON-duty and frequency according to loading conditions to maximize conversion efficiency. Due to the clock synchronization to the master clock or to an integer division of the master clock, switching harmonics are always related to the master clock frequency. The harmonics will be distributed as a factor to the master clock in the frequency domain. These are advantage of this PFM control topology according to the teachings of this disclosure. In PWM, SMPS operates at a fixed frequency (master clock in this case).

Light-load switching activity (measured by, for example, average switching frequency) of the converter may be reduced compared to other solutions. With adaptive ON-duty, an optimized switching frequency depends on load current, enhanced by synchronization clock division. ON-duty can be greater than that used by traditional PFM control by using a lower switching frequency at the same load current compared to other solutions.

Basic architecture requires zero current detection (ZCD) to happen before the next clock cycle to maintain the light-load mode (PFM). This dictates a safety factor α on the TON (α<1, Ts=1/fs=undivided base clock period):

$$T_{ON} = \alpha T_S \frac{V_O}{V_{IN}}$$

The inductor can be charged only to Ipk=α·ΔIpp, where ΔIpp is designed for typically 30-35% of the nominal output current. The inductor is therefore very poorly exploited. The charge transfer per switching cycle (Q) in DCM is limited to (L=buck converter inductance):

$$Q = \frac{I_{pk}(T_{ON} + T_{OFF})}{2} = \frac{V_{IN}}{V_O}(V_{IN} - V_O)\frac{(T_{ON})^2}{2L}$$

When ZCD is detected, the base clock frequency is reduced by a factor of N (N being an integer), then the new on-time TON' can be calculated based on fs/N (or N×Ts) rather than fs (TON'=N×TON), thus the charge transfer per switching cycle Q' becomes:

$$Q' = Q \times N^2$$

The improved method allows reduction of the switching activity (average switching frequency) <f> by a factor of $N^2$, while supporting the same load current IO in light-load mode (PFM):

$$\langle f \rangle = \frac{I_o}{Q}; \langle f' \rangle = \frac{I_o}{Q'} = \frac{I_o}{Q \times N^2} = \frac{\langle f \rangle}{N^2}$$

The converter may be implemented in any suitable application, using a microcontroller or microprocessor such as a power management integrated circuit (PMIC). The topology of the converter may be applied as well to other switching regulators, such as, for example but not limited to, a boost converter.

Figure 6:
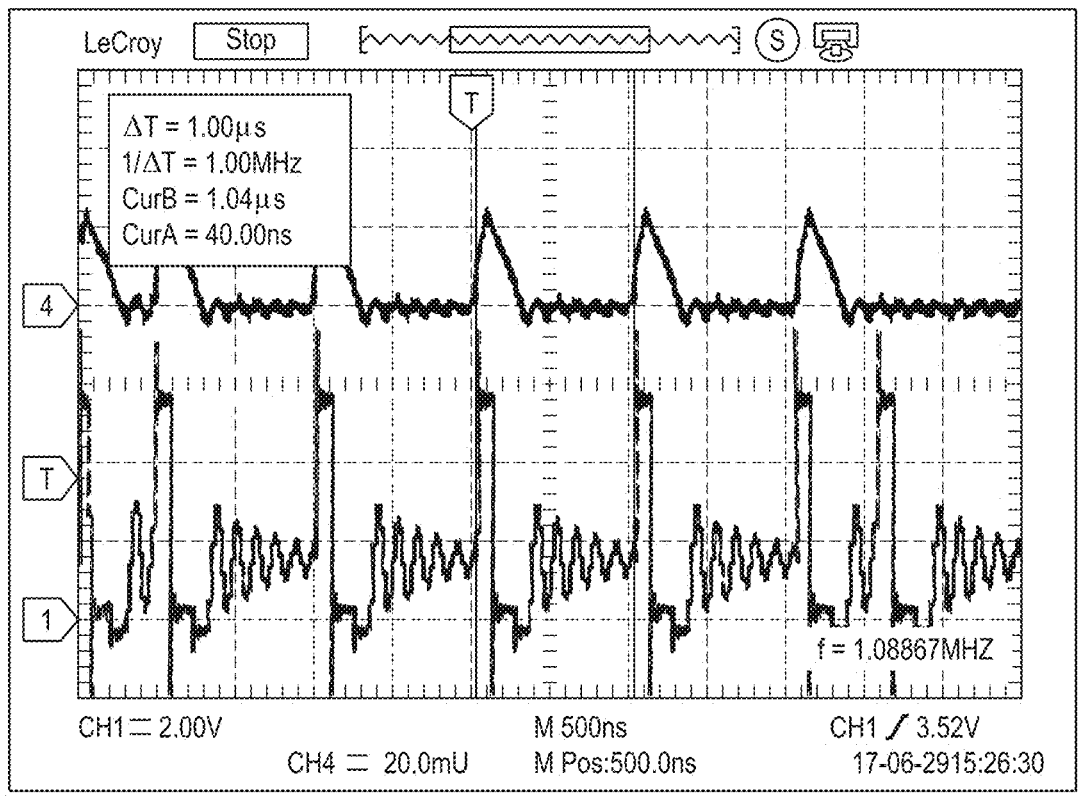
FIGS. 6 and 7 illustrate graphical comparisons of prior technology light-load mode waveforms and light-load waveforms according to the teachings of this disclosure.
Figure 6:
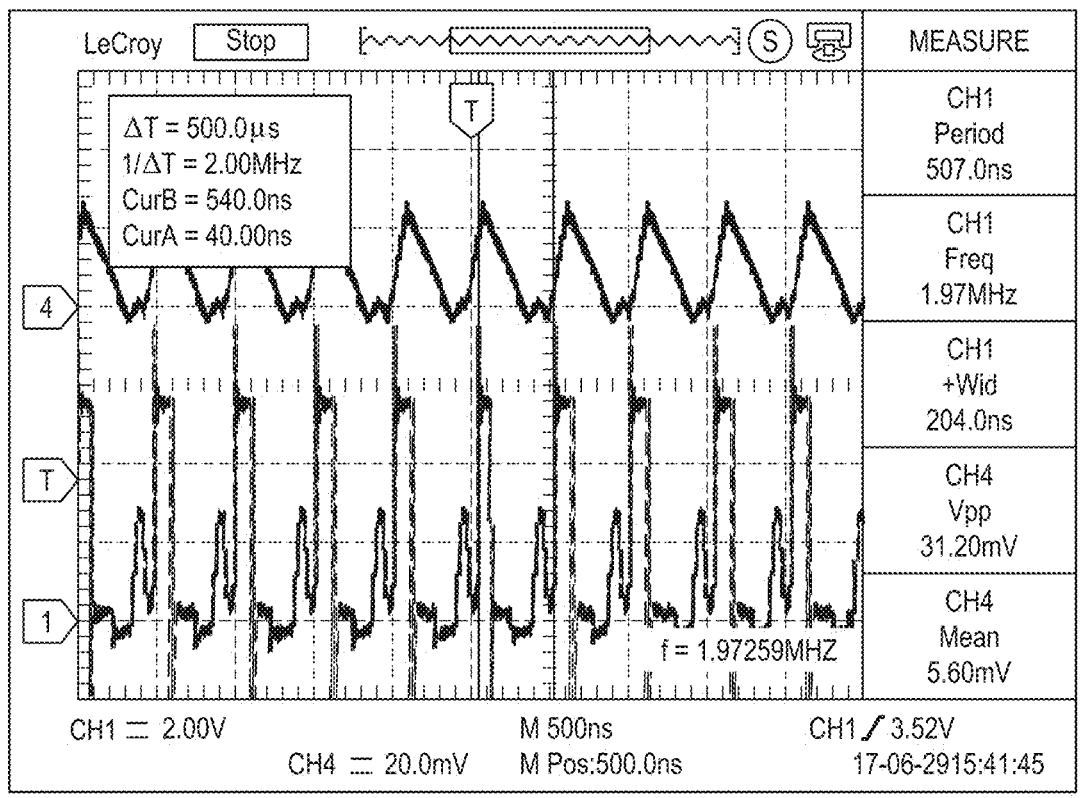
Figure 7:
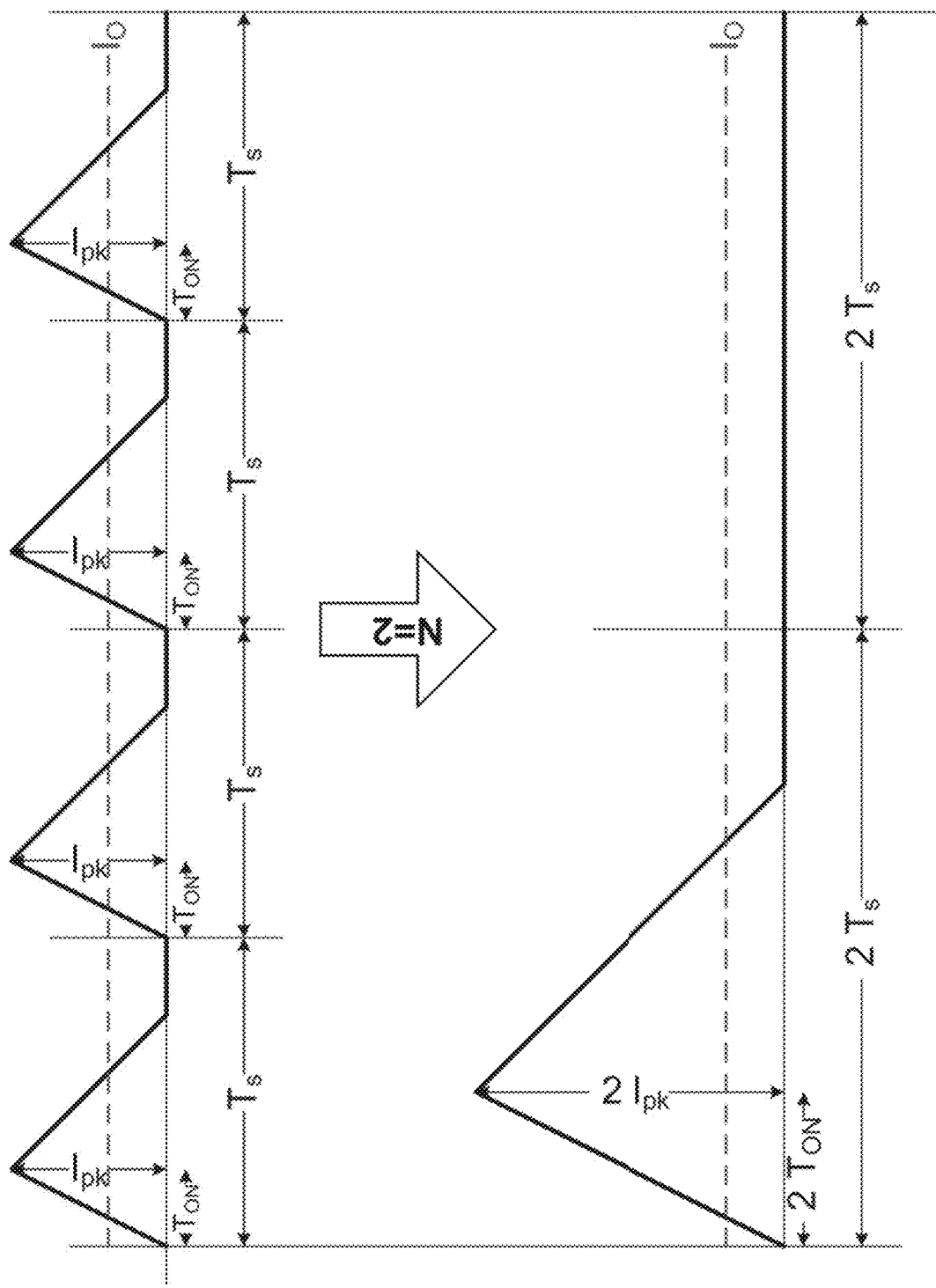

Referring to FIGS. 6 and 7, depicted are graphical comparisons of prior technology light-load mode waveforms and light-load waveforms according to the teachings of this disclosure. FIG. 6 illustrates performance for base clock frequency division for light-load mode used in prior technology solutions, and the light-load current pulses that are aligned to the undivided PWM clock at 2 MHz. Light-load mode pulses are aligned to an un-divided PWM clock. FIG. 7 illustrates improved performance for base clock frequency division for light-load mode, according to embodiments of the present disclosure. To achieve a further reduction of the switching frequency over prior technology as illustrated in FIG. 6, N may be a positive number greater than two (2). The frequency division method may present a tradeoff between switching activity reduction and output ripple (like any other PFM method), but still does not require any change in the target DC regulation voltage value.

Figure 8:
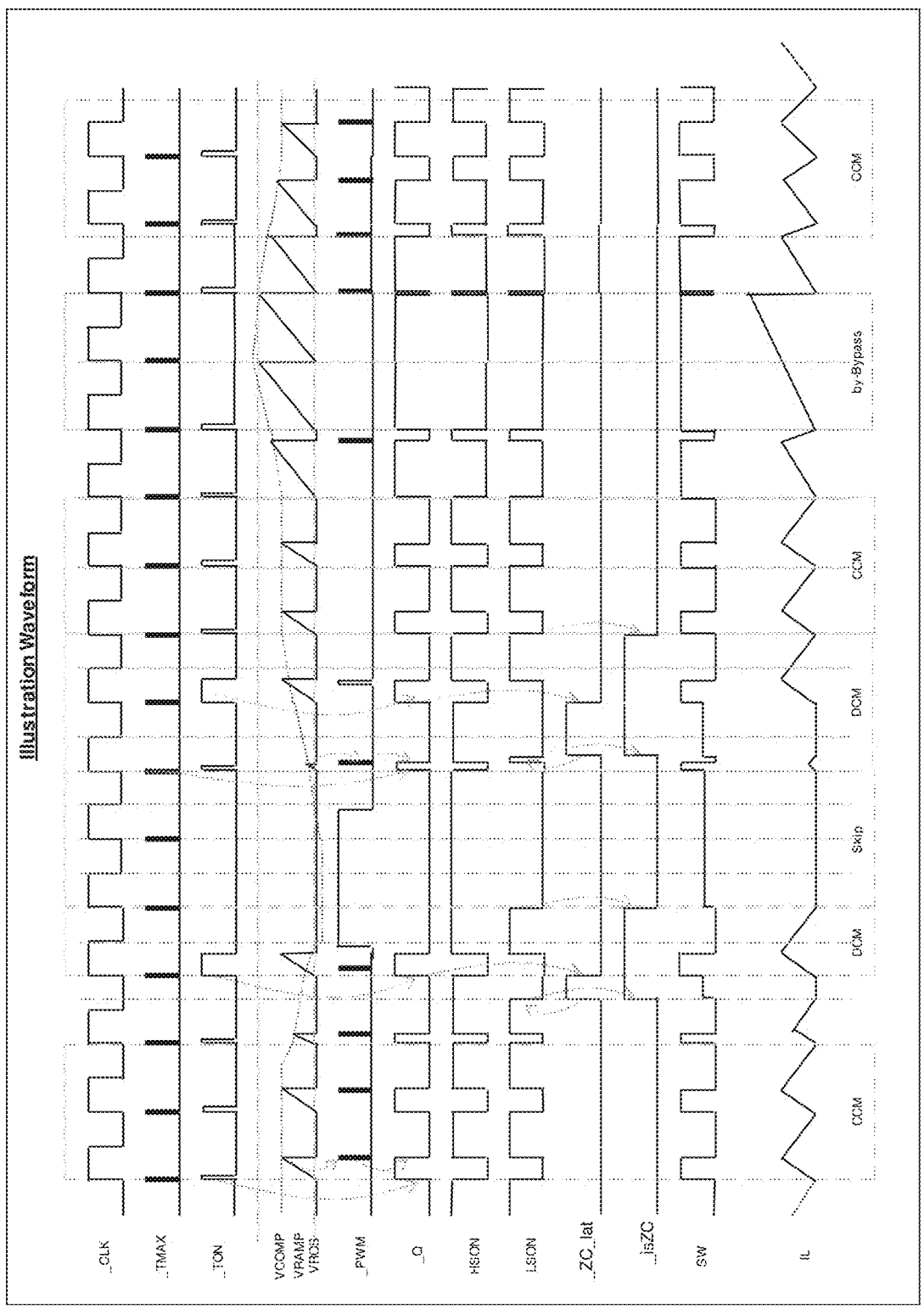
FIG. 8 illustrates a schematic timing diagram of the operation of the voltage converter shown in FIG. 1.

Referring to FIG. 8, depicted is a schematic timing diagram of the operation of the voltage converter shown in FIG. 1. FIG. 8 illustrates a typical operation of this architecture on PFM-PWM-bypass. All events are _CLK (master clock) base triggered. In PWM mode, which is in CCM, _Q is set by _TON and is reset by PWM. When _Q is high, the high-side power transistor 124 is turned on and charging the power inductor 118. When _Q is low, the low-side power transistor 126 is turned on and provides a low drop discharge path into VOUT for the power inductor 118. Generally, when the input voltage is charging the power inductor 118, energy is also provided directly to the output VOUT. When the load current decreases, residual energy will increase output voltage VOUT. Therefore, the closed-loop system will provide less energy in the next cycle by reducing the ON-duty. With a VCOMP decrease, _Q will be reset earlier, and less energy will charge the power inductor 118 in coming cycle. When loading current decreases to a level that the inductor current hits zero (entering DCM), adaptive ON-duty will be triggered. Ideally, this ON-duty is the same as that in PWM mode. When the load further decreases, switching clock frequency may be reduced by the adaptive ON-duty generator 106. By reducing the _TON frequency and adapting the _TON duration, efficiency is further improved over prior technology as more fully described hereinabove when in DCM and using the PFM operational mode. When the load increases, the system goes in a reverse way to enter CCM automatically.

Transition into the bypass mode from CCM may be done by reducing supply voltage under fixed load current conditions. As supply voltage is reduced, ON-duty needs to be increased to provide enough charge to the power inductor 118. When ON-duty generation approaches its limit at the master clock frequency, the voltage converter system can increase ON-duty by dividing the clock frequency, for example but not limitation, by two (2). Further dividing the clock frequency will further increase the ON-duty and reduce the drop of the output voltage VOUT. As the input supply is reduced even more, the high-side power transistor 124 will finally be completely turned on (100%).

Parts of the converter may be implemented in analog circuitry, digital circuitry, or instructions for execution by a digital processor (e.g., microcontroller), or any combination thereof. The instructions for execution by a processor that may be embodied in one or more computer-readable media such as a memory. The instructions, when loaded and executed by the processor, may cause the microcontroller or processor to implement the functionality of the present disclosure.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

What is claimed is:

1. A method for seamless mode transition in a switching regulator, wherein the switching regulator is a buck regulator and comprises:
    a high-side current sensor for providing a high-side current signal representing current going into a power inductor;
    a low-side current sensor for providing a low-side current signal representing current in the power inductor;
    a zero-current detector coupled to the low-side current sensor and providing detection of substantially zero current in the power inductor;
    a pulse generator for generating pulse width modulation and pulse frequency modulation;
    an adaptive on-duty generator coupled to the pulse generator and controlling a high side ON time thereof;
    a differential amplifier having a first input coupled to a voltage output of the switching regulator and a second input coupled to a voltage reference;
    a voltage comparator having a first input coupled to an output of the differential amplifier and a second input coupled to a slope compensation circuit; and
    a master clock oscillator coupled to the adaptive on-duty generator;
said method comprising the steps of:
    using a pulse width modulation (PWM) mode in the buck regulator to provide current pulses to a power inductor when in a continuous conduction mode (CCM) during a first load condition;
    using a pulse frequency modulation (PFM) mode to provide current pulses to the power inductor when in a discontinuous conduction mode (DCM) during a second load condition, wherein the first load condition is greater than the second load condition; and
    generating a voltage having a sawtooth waveform from the high side current signal by the slope compensation circuit and feeding the voltage into the second input of the voltage comparator, wherein the slope compensation circuit is coupled to the high-side current sensor, wherein the voltage comparator causes the pulse generator to turn off a high side power transistor coupled between a voltage source and the power inductor when the sawtooth voltage from the current sense and slope compensation circuit is greater than the output voltage of the differential amplifier during a pulse width modulation (PWM) mode;
wherein the adaptive on-duty generator is coupled to the zero-current detector and switches, when substantially zero current is detected by the low side current sensor in the power inductor, to a pulse frequency modulation (PFM) mode by controlling the pulse generator so as to have similar amounts of energy per switching cycle as during the PWM mode of operation.

2. The method according to claim 1, further comprising the step of using a bypass mode to provide current to the power inductor during a third load condition, wherein the third load condition is greater than the first load condition.

3. The method according to claim 1, wherein the step of using the PFM mode further comprises the steps of reducing switching frequency with adaptive clock frequency division and duty cycle estimation.

4. The method according to claim 3, wherein the switching frequency is reduced when load current is reduced.

5. The method according to claim 1, wherein the step of synchronizing switching between PWM and PFM modes is done with a single control loop.

6. The method according to claim 5, wherein the step of adaptive clock frequency division comprises the step of dividing the master clock frequency by N.

7. The method according to claim 5, wherein the step of duty cycle estimation comprises the step of calculating the duty cycle duration based on input voltage and output voltage.

8. The method according to claim 5, wherein the step of duty cycle estimation comprises the step of scaling the duty cycle duration in proportion to the master clock frequency division.

9. The method according to claim 6, wherein N is equal to two (2).

10. The method according to claim 6, wherein N is a positive integer number.

11. The method according to claim 6, wherein N is equal to $2^P$, where P is a positive number equal to or greater than one (1).

12. The method according to claim 6, wherein the step of dividing the master clock frequency by N further comprises the step of dividing the master clock frequency by N when substantially zero (0) current in the power inductor is detected.

13. The method according to claim 12, further comprising the step of detecting substantially zero (0) current in the power inductor before a next clock cycle.

14. A controller for a switching regulator with adaptive duty control and seamless transition of operating modes, comprising:
a high-side current sensor for providing a high-side current signal representing current going into a power inductor;
a low-side current sensor for providing a low-side current signal representing current in the power inductor;
a zero-current detector coupled to the low-side current sensor and providing detection of substantially zero current in the power inductor;
a pulse generator for generating pulse width modulation and pulse frequency modulation;
an adaptive on-duty generator coupled to the pulse generator and controlling a high side ON time thereof;
a differential amplifier having a first input coupled to a voltage output of the switching regulator and a second input coupled to a voltage reference;
a voltage comparator having a first input coupled to an output of the differential amplifier and a second input coupled to a voltage having a sawtooth waveform generated from the high side current signal by a slope compensation circuit, wherein the slope compensation circuit is coupled to the high-side current sensor, wherein the voltage comparator is configured to cause the pulse generator to turn off a high side power transistor coupled between a voltage source and the power inductor when the sawtooth voltage from the current sense and slope compensation circuit is greater than the output voltage of the differential amplifier during a pulse width modulation (PWM) mode;
wherein the adaptive on-duty generator is coupled to the zero-current detector and configured, when substantially zero current is detected by the low side current sensor in the power inductor, to switch to a pulse frequency modulation (PFM) mode by controlling the pulse generator so as to have similar amounts of energy per switching cycle as during the PWM mode of operation; and
a master clock oscillator coupled to the adaptive on-duty generator.

15. The controller according to claim 14, wherein the adaptive on-duty generator comprises an ON timer and logic circuits for estimating on-time required during operation of the PFM mode.

16. The controller according to claim 14, wherein the differential amplifier comprises an operational transconductance amplifier (OTA).

17. The controller according to claim 14, wherein the differential amplifier comprises a voltage operational amplifier.

18. The controller according to claim 14, wherein the voltage reference comprises a digital-to-analog converter (DAC).

19. The controller according to claim 14, wherein the controller for the switching regulator comprises a mixed signal microcontroller.

20. The controller according to claim 19, wherein the microcontroller comprises a power management integrated circuit (PMIC).

21. A switching regulator voltage converter with adaptive duty control and seamless transition of operating modes, comprising:
a power inductor having first and second nodes;
a capacitor couple between the second node of the power inductor and a voltage common, wherein the second node of the power inductor and voltage common are adapted for coupling to and providing regulated voltage and current to an electronic device;
a high-side current sensor for providing a high-side current signal representing current going into the power inductor;
a high side power transistor coupled between a voltage source and the first node of the power inductor;
a low-side power transistor coupled between the first node of the power inductor and the voltage common;
a low-side current sensor for providing a low-side current signal representing current in the power inductor;
a zero-current detector coupled to the low-side inductor current sensor and providing detection of substantially zero current in the power inductor;
a pulse generator for generating pulse width modulation and pulse frequency modulation;
an adaptive on-duty generator coupled to the pulse generator and controlling a high side ON time thereof;

a differential amplifier having a first input coupled to the second node of the power inductor and a second input coupled to a voltage reference;

a voltage comparator having a first input coupled to an output of the differential amplifier and a second input coupled to a voltage having a sawtooth waveform generated from by a slope compensation circuit receiving the high side current signal, wherein the slope compensation circuit is coupled to the high-side current sensor, wherein the voltage comparator is configured to cause the pulse generator to turn off a high side power transistor coupled between a voltage source and the power inductor when the sawtooth voltage from the slope compensation circuit is greater than the output voltage of the differential amplifier during a pulse width modulation (PWM) mode;

wherein the adaptive on-duty generator is coupled to the zero-current detector and configured, when substantially zero current is detected in the power inductor through the low side current signal, to switch to a pulse frequency modulation (PFM) mode by controlling the pulse generator so as to have similar amounts of energy per switching cycle as during the PWM mode of operation; and a master clock oscillator coupled to the adaptive on-duty generator.

22. The switching regulator voltage converter according to claim 21, further comprising a voltage divider coupled between the second node of the power inductor and the first input of the differential amplifier.

\* \* \* \* \*